Jan. 11, 1955  E. M. KEEN ET AL  2,699,250
CONVEYER
Filed Jan. 23, 1952  2 Sheets-Sheet 1
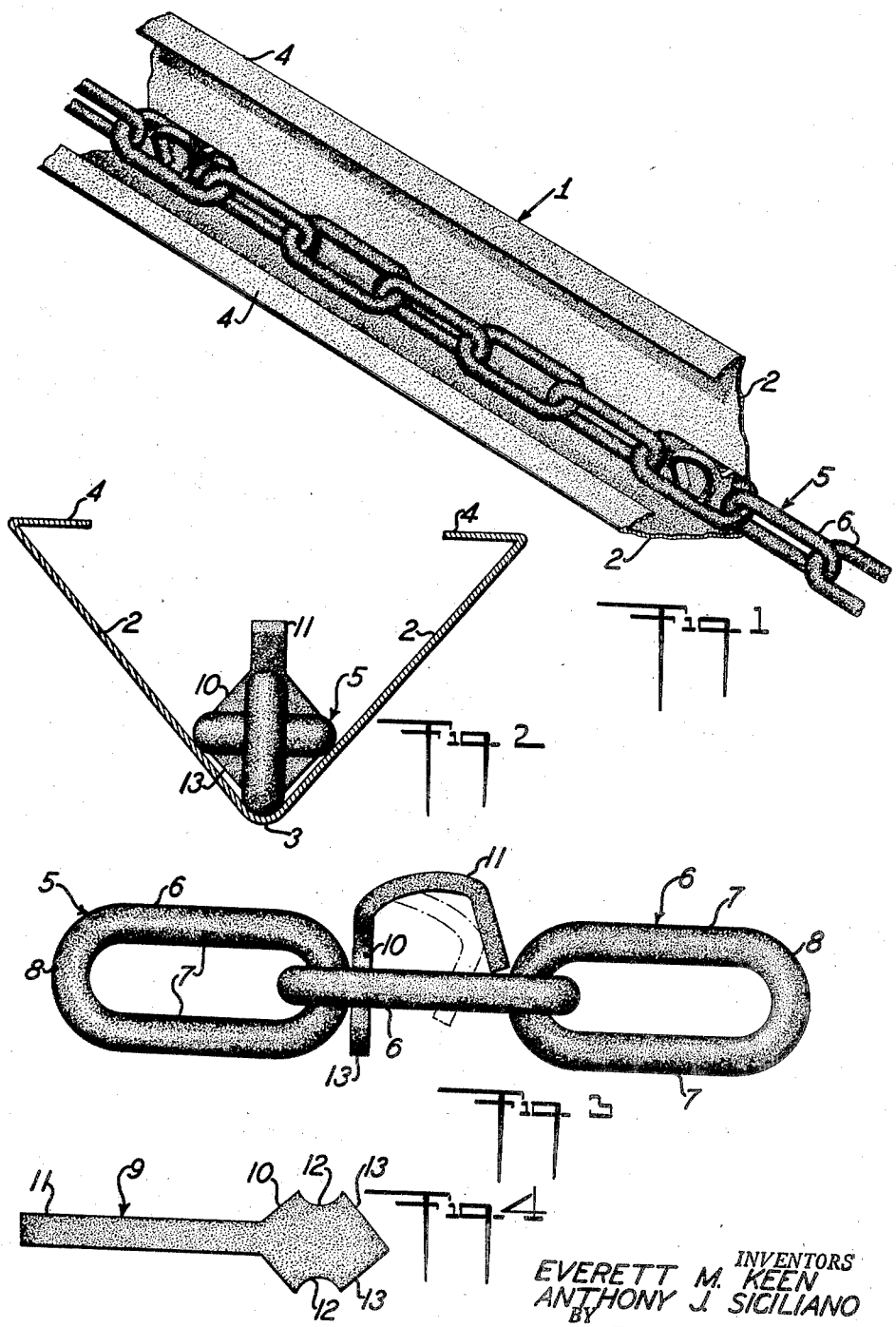
INVENTORS
EVERETT M. KEEN
ANTHONY J. SICILIANO
BY
Albert H. Kirchner
ATTORNEY

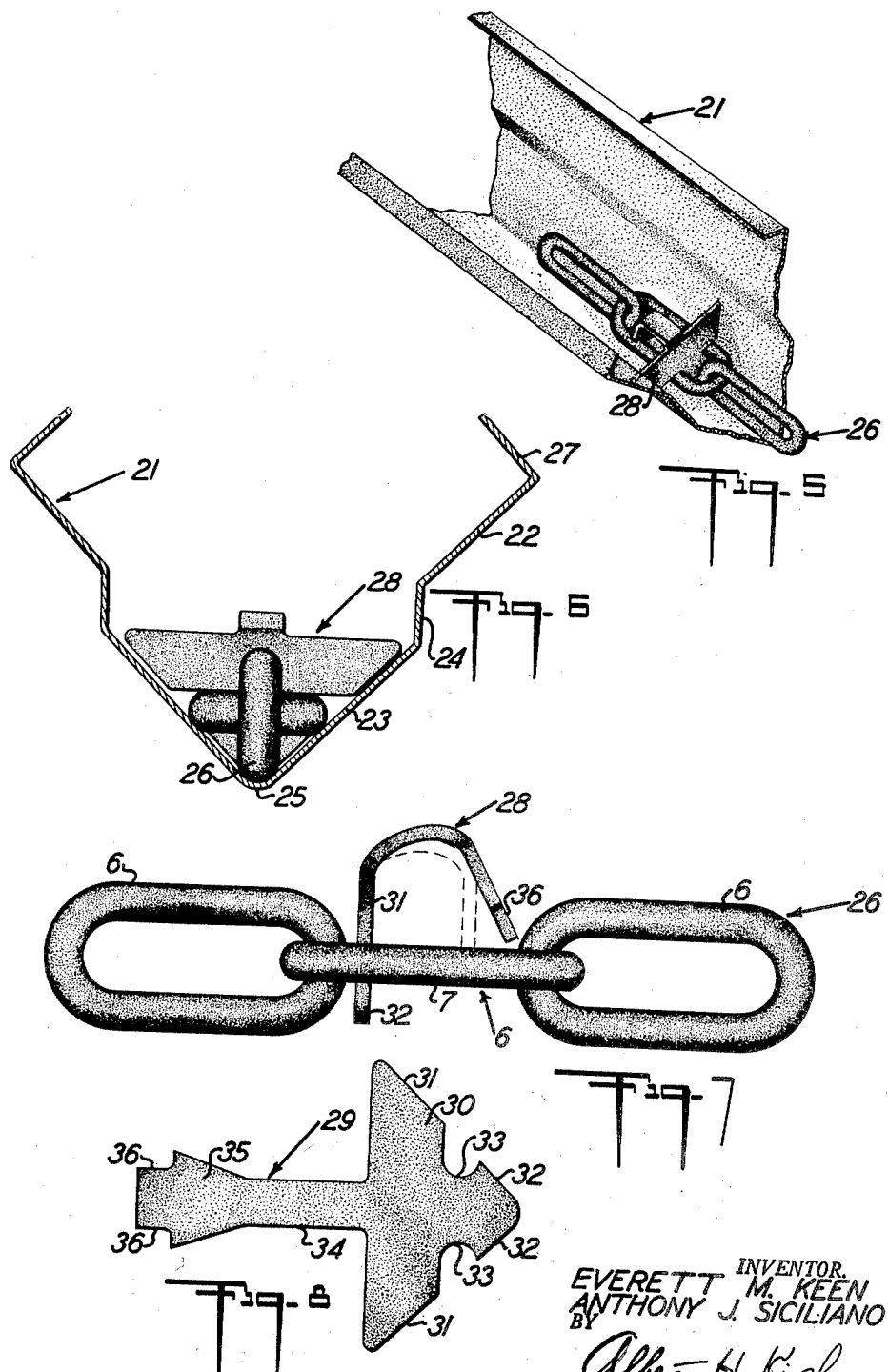

ably made in the form of a length of a common type of
United States Patent Office 2,699,250
Patented Jan. 11, 1955

2,699,250

CONVEYER

Everett M. Keen and Anthony J. Siciliano, Vineland, N. J., assignors to Keen Manufacturing Corporation, Vineland, N. J., a corporation of New Jersey Application January 23, 1952, Serial No. 267,756

4 Claims. (Cl. 198—176)

The present invention relates to conveyors, and more particularly to a conveyor comprising a fixed horizontal open-topped trough in which a movable, generally flexible line is pulled to propel poultry feed along the trough.

The primary object of the invention is to provide a conveyor of the general type indicated which will be simple and inexpensive in construction, durable and fool-proof in use, and which will be effective to move along the trough a continuous supply of generally granular or divided material such as poultry feed.

In commercial poultry raising installations, particularly those which are operated on a large scale, it is customary to provide a feed hopper which discharges, generally at definite feeding times during each day, a quantity of feed into an elongated trough arranged in the poultry house for access by the poultry. The trough is generally of considerable length, and it functions to carry the feed from the supply hopper to a discharge receptacle, being kept full of feed throughout its length to supply the poultry.

It is important that the feed be moved at constant speed along the trough, maintaining a uniform level therein except as the level may be lowered as the birds consume the feed, and important objects of the present invention are concerned with providing a conveyor for the trough which will satisfactorily discharge these functions.

The feed which is propelled through the trough is generally a mixture of corn, small grain, pellets or mash, frequently having a fairly high moisture content, so that the particles tend to cohere and pack. This property of the feed makes it difficult to propel by conventional and other prior art conveyor means, many of which are defective because they ultimately, after a short period of operation, result in tunneling through the compacted feed and thus cease to propel the material, or because they are equipped with high, wide flights or other projections which extend above the top of the trough contents and extend across the full width of the trough and thus strike the beaks of the birds and interfere with their feeding.

A particular object of the present invention is to provide a trough with a moving conveyor element which will prevent all tendency of the feed to arch in the trough, which will not tunnel through the trough contents, and which will keep the feed moving at a constant and uniform rate of speed along the trough.

Other objects and advantages of the invention will be more apparent from the following description of the preferred embodiments shown in the accompanying drawing, in which Figure 1 is a perspective view on a generally reduced scale, of one form of the combination of the trough and propelling means or member;

Fig. 2 is a transverse vertical section, on substantially full scale;

Fig. 3 is a side elevational view of a portion of the conveyor element;

Fig. 4 is a plan view of a blank from which one of the flight elements is formed; and Figs. 5, 6, 7 and 8 are views similar to those of Figs. 1, 2, 3 and 4 respectively, but showing a modified form of trough and flight element.

Generally speaking, the invention comprises the combination of a generally V-shaped open-topped trough and a chain disposed in the trough bottom for movement along the trough, well beneath the trough top, preferably but not necessarily containing flights in certain of its links for improving the efficiency of the propelling action of the chain.

In the drawing, reference numeral 1 designates generally a trough, conveniently made of sheet metal formed to provide a pair of side walls 2 which intersect at an included angle of approximately 90° or slightly less to provide a bottom vertex 3 and which terminate at their upper lips or edges in oppositely inwardly directed flanges 4. The vertex 3 may take the form of a sharp line, but it is preferable to form the vertex as a rounded curve, as best shown in Fig. 2.

Nested within the trough, and extending longitudinally along it, is a flexible conveyor member 5, which is preferiron chain, of the kind sometimes known as a log chain. Such a chain is composed of interengaged links 6, each consisting of a pair of generally parallel side bars 7 connected by integral semi-circular curved ends 8 to provide a generally elliptical, oval or oblong loop. The links are made of relatively heavy round bar stock, and the linking is such that alternate links are disposed relatively right angularly to each other, as shown in the drawing.

With the chain disposed in the bottom of the trough, the lower side bars of alternate links which are disposed in a vertical plane rest in the vertex 3, and the two side bars of each link which is disposed in a horizontal plane engage the inner surfaces of the side walls 2 slightly above the vertex 3. The chain is thus supported in a very stable manner by the contact of its links alternately with the vertex and the side walls of the trough, and the proportions of the chain and trough are such that the upper side bars of the vertical links are disposed well below the level of the flanges 4 or other lips at the top of the trough.

If, as is preferred, the vertex 3 is made rounded or curved instead of sharply edged, the chain makes snug fit in the vertex.

When the trough is filled with feed or the like and the chain is pulled along it, by means not shown, the feed moves steadily as a stream, with the chain preferably fully buried and concealed from view. Of course the chain is best made endless, by having its terminal links connected to each other, so that it can be propelled by a rotating sprocket or other conventional means.

We have found the combination of trough and chain as thus far described entirely satisfactory in propelling most standard types of poultry feed.

However, some special types of feed are so high in moisture content, or contain such high proportions of vitaminiferous oils and other dietary supplements, that the grains or other particles tend to cohere to such an extent that the chain tends to tunnel through the mass of feed, which arches over it and thus resists constant, uniform propulsion.

To overcome this difficulty we find it convenient to incorporate flights at spaced intervals along the length of the chain. These flights preferably take the form of the lugs shown in the drawing, one type of which may be made from the blank 9 shown in Fig. 4. This blank can be a heavy sheet metal stamping, consisting of a widened lobe or blade 10 at one end and an elongated narrow tongue 11 at the other end. The blade is formed with opposite, semi-circular side notches 12 at about its mid portion, and with intersecting edges 13 at one end of the notches. These edges are inclined at substantially the same angle as that of the trough side walls 2, and the notches 12 are spaced apart a distance equal to the internal spacing between the side bars 7 of the links of the chain.

The arrangement is such that a blade 10 can be inserted into any of the links and twisted or turned to assume a straight transverse position relatively to the link, in which position the notches 12 will snugly engage and be frictionally held between the side bars. When thus installed, the tongue 11 projects upwardly, or it may be and preferably is preformed into the bent condition shown in full lines in Fig. 3. It will be noted that the bend there shown is not sufficient to prevent insertion and twisting of the blade to seat the notches 12 against the side bars of the chain. In such form the flight is liable to become dislodged and separated from the link, since it is possible for it to swing in the same manner in which it was swung when installed. To prevent such separation the inserted blade is further bent, to the dotted line position shown in Fig. 3, in which the free end portion of the tongue 11 is depressed into the space between the link side bars.

In this position the tongue is free to move only through a very slight angle within the loop formed by the chain link. It will be stopped by one or the other of the side bars after loosening and swinging through only a few degrees. Consequently even though the flight becomes loosened, it cannot swing far enough from directly transverse position to become disengaged from the link.

The flights are installed in certain of the horizontally disposed links, e. g., each third or fourth horizontal link, as shown in the drawing. When thus installed the bent tongues project somewhat above the level of the upper side bars of the vertically disposed links, and well below the top edges or flanges 4 of the trough.

In use the trough is filled from a supply hopper, equipped with a suitable level control, so that the surface of the feed in the trough will be at about or just below the tops of the down bent tongues of the flights. The moving chain propels the material by the pushing effect of the leading or forward curved ends 8 of both the vertical and horizontal links. The blades of the flights insure movement of all feed in the lower portion of the trough, thus preventing packing of the material, and the tongues of the flights cut through the upper zone of the feed, thus breaking any arches into which the feed may tend to form and effectively preventing tunneling of the chain. As will be understood, the broken arches collapse and their sides fall into engagement with the links or flight blades for propulsion along the trough.

The flights, being confined wholly within the link loops, i. e., entirely between the side bars of the horizontally disposed links, permit the chain to be trained in either direction, to the right or the left, around driving or idle sprockets or pulleys, in the grooves or with the teeth of which the links are engageable without interference from the flights. This is of particular advantage in adapting the principles of the invention to be used in arranging a trough installation in long parallel runs connected at their ends by short cross runs through which the chain turns alternately right and left. Such as arrangement, which is not possible with a conveyor element which can be turned in only one direction about a sprocket or pulley, provides maximum trough length in any given floor area.

Various details of the illustrated, preferred construction may be varied or omitted within the broad principles of the invention as defined by the broader of the appended claims. Thus, as has been explained, the flights may be omitted, as for use with feeds which are sufficiently dry to be propelled satisfactorily by the links alone. Furthermore, the specific cross sectional shape of the trough may be modified, as long as at least the lower portions of the side walls converge to the vertex in which the lower side bars of the vertical links seat, and the lip flanges 4 may be omitted. The flanges in the form shown are useful in preventing loss of material by the scattering action of the feeding birds, and the flanges also trim the tops of the side walls and stiffen the trough as a whole.

One such modified form of the invention is shown in Figs. 5 to 8 inclusive. There the trough 21 has angularly converging side wall portions 22 and 23 at the upper and lower areas of the trough respectively, connected by intermediate vertical side wall portions 24. The lower converging portions 23 intersect in a rounded vertex 25 at the bottom of the trough, in which is seated a conveyor member 26 in the form of the chain 5. The upper sloping side wall portions 22 may be trimmed by inwardly directed flanges 27 which may be horizontally directed like the flanges 4 or which may be upwardly sloping as shown in Figs. 5 and 6.

The trough 21, with its vertical side wall portions 24 minimizes the tendency of certain types of feed mixes to stick to the trough sides and is found useful with those mixes which are high in moisture or oil content.

The inclined upper portions 22 of the side walls have a wide enough spread to prevent arching of the trough contents, and the lower sloping side wall portions 23 incure no danger of arching, regardless of the kinds of mixes with which the trough may be filled, if flights of the type shown at 28 be used.

The flight 28 is generally like that formed from the blank 9, but its blank, designated 29 in Fig. 8, differs in several respects. Its blade 30 has a widened, flaring portion 31 above the intersecting lower edges 32 and separated therefrom by notches 33, and its tongue 34 is widened to provide an outwardly flaring portion 35 terminating in end notches 36 which seat between the side bars 7 of a horizontal link 6 when the flight, bent as shown in full lines in Fig. 7, has had its notches 33 seated between the side bars and is then further bent to the shape shown in broken lines in Fig. 7.

The proportions are preferably such that the upper flaring portions 31 of the flight do not contact the trough side walls and are positioned just below the vertical portions 24 of the side walls. Thus there is no scraping of the trough by any parts of the flights, all of the bearing of the composite conveyor being performed by contact of the links with the lower portions of the trough side walls.

The shoulders which define the notches 36 improve the fit of the flights in the links 6 and prevent turning and consequent loosening of the flights relatively to the links.

It will be evident that, if desired, a conveyor chain having flights 28 can be used in a trough of the type shown in Figs. 1 and 2, and that the trough of Figs. 5 and 6 can, if desired, be used in combination with a chain having flights of the kind shown in Figs. 3 and 4.

Other changes in the specific embodiments which have been selected to illustrate the invention can be made within the scope and purview of the broader of the appended claims.

We claim:

1. A conveyor comprising a trough having a pair of side walls inclined substantially equally and oppositely to the vertical and intersecting at an included angle of substantially 90°, propelling means disposed within said trough for movement along said bottom comprising a chain having links of generally elliptical shape with alternate links disposed respectively in horizontal planes and vertical planes with the lower side bars of the vertical links engaging the vertex of the angle and with the side bars of the horizontal links engaging the side walls of the trough above said vertex, and flights secured in certain of said horizontal links, each flight comprising a blade having lower side edges intersecting at substantially the angle at which the trough side walls intersect and having notches above said lower side edges for engaging and snugly frictionally fitting the side bars of a horizontal link.

2. The combination claimed in claim 1, in which a tongue extends from the upper portion of said blade and is bent into substantially U-shape and terminates in a free end between the side bars of said horizontal link.

3. The combination claimed in claim 2, in which the upper portion of the tongue is disposed above the level of the side bars of the vertical links.

4. The combination claimed in claim 2, in which the upper portion of the tongue is disposed above the level of the side bars of the vertical links and below the level of the top of the trough sides.

References Cited in the file of this patent

UNITED STATES PATENTS

| Number | Name | Date |
|---|---|---|
| 1,048,848 | Miner | Dec. 31, 1912 |
| 1,902,873 | Marone | Mar. 28, 1933 |
| 2,244,442 | Blauvelt | June 3, 1941 |

FOREIGN PATENTS

| Number | Country | Date |
|---|---|---|
| 238,369 | Great Britain | Aug. 20, 1925 |